United States Patent [19]

Dunn et al.

[11] 4,352,467
[45] Oct. 5, 1982

[54] METHOD OF SPIRAL WINDING STRIP MATERIAL

[75] Inventors: William F. Dunn; Ernest A. Milan, both of Stow, Ohio

[73] Assignee: The Goodyear Tire & Rubber Company, Akron, Ohio

[21] Appl. No.: 168,074

[22] Filed: Jul. 14, 1980

[51] Int. Cl.³ .............................................. B65H 17/02
[52] U.S. Cl. ................................ 242/55; 242/67.3 R; 242/158 R; 242/DIG. 2
[58] Field of Search ............... 242/55, 54 R, DIG. 2, 242/57.1, 67.1 R, 67.3 R, 158 R, 158.2, 158.4 R, 158.4 A

[56] References Cited

U.S. PATENT DOCUMENTS

| | | | |
|---|---|---|---|
| 2,437,725 | 3/1948 | Conner | 242/158.4 A |
| 2,912,187 | 11/1959 | Rau, Jr. | 242/158.4 R |
| 2,998,692 | 9/1961 | Garner | 242/54 R X |
| 3,042,326 | 7/1962 | Lamb et al. | 242/158.4 R X |
| 3,312,421 | 4/1967 | Kerr et al. | 242/158.4 R |
| 3,963,186 | 6/1976 | Van Den Aa | 242/DIG. 2 X |
| 3,997,122 | 12/1976 | Helfand et al. | 242/DIG. 2 X |
| 4,093,146 | 6/1978 | Haley | 242/158.2 |
| 4,170,504 | 10/1979 | Riggs | 242/55 X |

Primary Examiner—John M. Jillions
Attorney, Agent, or Firm—Frederick K. Lacher; T. P. Lewandowski

[57] ABSTRACT

Strip material coming from a letoff position is wound on a supply reel by rotating the reel while at the same time providing axial movement of the reel relative to the letoff. The axial movement is stopped for a predetermined period of time when the strip reaches an end portion of the reel and before the relative axial movement is reversed to form another layer on the reel to provide a supporting edge surface for other layers and reduce the induced curl in the strip material. Each successive layer of strip material may be of a shorter length to provide a pyramid configuration to maintain the position of the windings. This method may be controlled by a microprocessor programmed with a basic sequence which can be altered by the operator to set the number of base layers, the number of pyramid layers and the duration of the interval during which there is no relative axial movement of the shell and the letoff at the end of each pass on the supply reel.

6 Claims, 5 Drawing Figures

METHOD OF SPIRAL WINDING STRIP MATERIAL

This invention relates to a method of spiral winding strip material from a letoff position onto a supply reel and especially to the process of spiral winding extruded plastic materials carried by a strip of separator material on a cylindrical shell of a strip supply reel.

In U.S. Pat. No. 4,170,504 which is assigned to the assignee of this application, an apparatus for building tires is shown and described in which narrow strips such as chippers, chafers, toe strips, apex strips, shoulder wedges and the like are spirally wound around a supply reel. This apparatus is especially useful for handling strip components peculiar to tire making which are uniformly tacky, readily subject to plastic deformation, and difficult to maintain in a uniform condition during application to a tire drum in the building process. It has been found, however, that with certain strips of rubber stock which are extruded or otherwise processed at an elevated temperature and then delivered in this above-ambient temperature condition for winding around the supply reel, a curl in the strip is induced by the instantaneous reversal of the supply reel direction. Then after cooling this curl is set up in the strip and may cause problems in building of the tire because the strip which is fed from the supply reel to the tire building drum may need to be straightened or otherwise adjusted by the tire building machine operator.

The spiral winding of strip material especially when it includes a strip of separator material carrying other material has been difficult also in that the strip of separator material tends to slip off at the ends as the number of layers are increased.

It has also been found that with different sizes and types of strip material the amount of slippage and the curl induced in the strips varies so that the reel rotation settings which overcome these problems for one strip may not be satisfactory for another strip.

In accordance with this invention, the strip material is wound on the supply reel in such a manner that the necessary edge support is provided while at the same time the induced curl is minimized as required for different sizes and types of strip material.

In accordance with an aspect of the invention, there is provided a method of spiral winding strip material from a letoff position onto a supply reel comprising (a) laying an end of said strip material on the surface of said reel and continuously rotating said reel;

(b) providing forward axial movement of said reel relative to said letoff position in a first direction to spiral wind said strip on the surface of said reel;

(c) stopping said forward axial movement at a first predetermined position on said reel to form a first layer of said strip material having an axial length less than the length of said reel;

(d) continuing to rotate said reel for a predetermined rotation to provide a minimum of induced curl and a supporting surface for other layers of said strip material at said first predetermined position on said reel;

(e) providing a reverse axial movement of said reel relative to said letoff position in a second direction opposite to said first direction;

(f) stopping said reverse axial movement in said second direction at a second predetermined position on said reel to form a second layer of said strip material;

(g) continuing to rotate said reel for a predetermined rotation to provide a minimum of induced curl and a supporting surface at said second predetermined position on said reel;

(h) thereafter continuing to alternately provide said forward and reverse axial movement of said reel relative to said letoff position and stopping said axial movement to form overlapping layers and continuing to rotate said reel when said axial movement is stopped for a predetermined rotation of said reel to provide a spiral wrapping of said strip with supporting surfaces at both said predetermined positions on said reel and a minimum of induced curl due to reversal of the axial movement of said reel relative to said letoff position.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
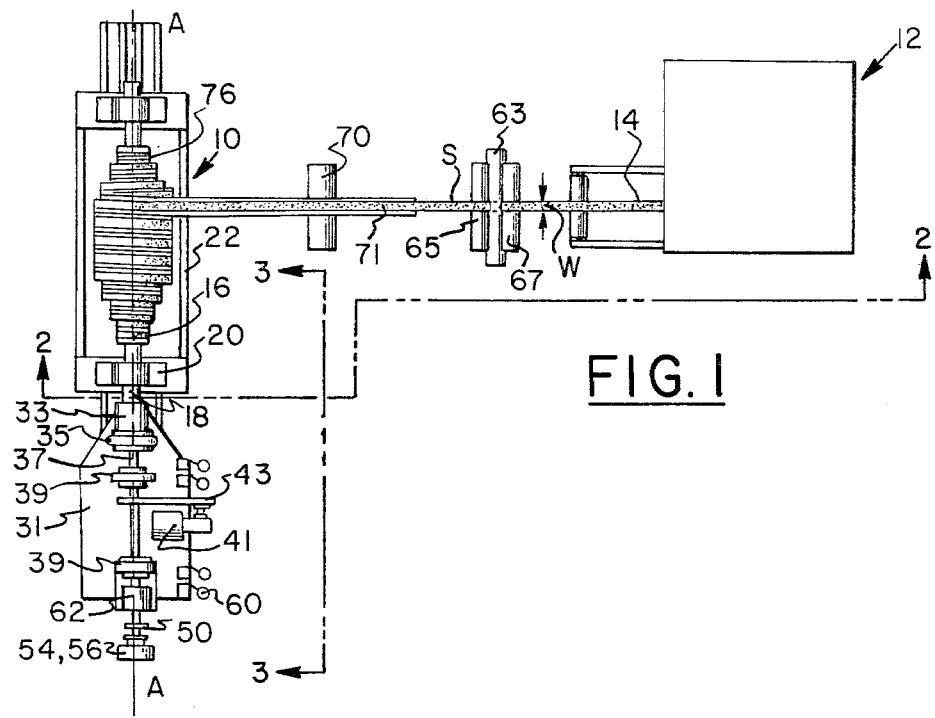
FIG. 1 is an overall plan view of apparatus which can be utilized in practicing the method of this invention.
Figure 2:
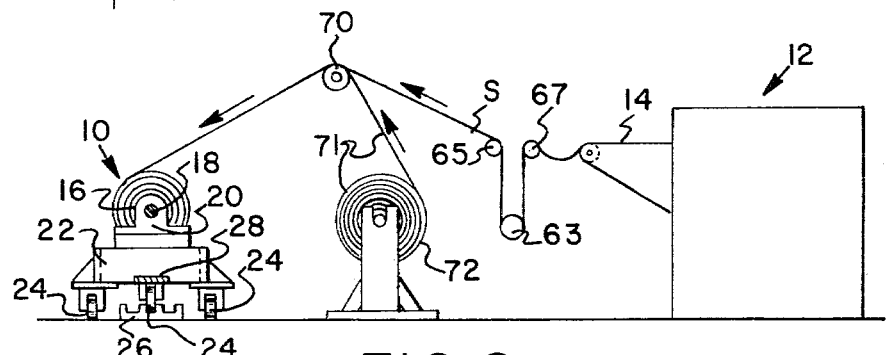
FIG. 2 is a front elevation taken along the plane of line 2—2 in FIG. 1.
Figure 3:
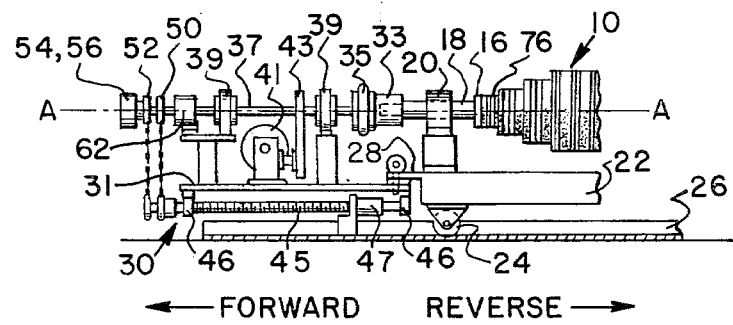
FIG. 3 is a side elevation taken along the plane of line 3—3 in FIG. 1 with parts being broken away.

Referring to FIGS. 1, 2 and 3, a strip supply reel 10 is shown in the process of being filled or wound with a strip S of material from a conventional strip preparation apparatus 12 at a letoff position 14 which may be, for example, a calender, an extruder, or a bias cutter-splicer which is capable of preparing strips S for winding on the supply reel 10.

The supply reel 10 includes a right circular cylinder 16 having a rigid surface and being rotatable on a conventional shaft 18 which is carried in bearings 20 mounted on a truck 22. The truck 22 has supporting wheels 24 with at least some of the wheels being engageable with a guide rail 26 extending parallel to an axis A—A of the cylinder 16. A tongue 28 on the truck 22 is releasably connected to a traversing mechanism 30 by which the supply reel 10 is moved axially relative to the letoff position 14 in a forward or reverse direction of the reel and transversely of the direction of travel of the strip S being wound thereon. A windup drive unit is situated on a platform 31 of the traversing mechanism 30 and includes a spline coupling 33 releasably connected to the shaft 18. The coupling 33 includes a flexible element 35 fixed on the end of a windup shaft 37 which is mounted in bearings 39 secured to the platform. A conventional gear motor 41 or equivalent is connected by a flexible drive 43 to the shaft 37 to rotate the cylinder 16 of the supply reel 10.

Referring to FIG. 3, the traversing unit 30 includes a screw 45 parallel to the axis A—A of cylinder 16 and mounted rotatably in bearings 46 fixed on the platform 31. The screw 45 is threaded in a nut 47 fixed with respect to the ground or floor in such a manner that the platform 31 and the truck 22 while connected to the platform move in response to rotation of the screw. The screw 45 is connected to the shaft 37 by two flexible drives 50 and 52 of the chain and sprocket type, each of which is connected to or disengaged from the shaft 37 by a forward clutch 54 and a reverse clutch 56 providing forward and reverse movement of the supply reel 10. The forward clutch 54 and reverse clutch 56 are operated by suitable controls including a right-hand limit switch 58 and a left-hand limit switch 60.

A speed ratio selector 62 may be connected between the shaft 37 and the flexible drive 43 to provide a convenient change in the speed ratio of the rotation of the screw 45 relative to the rotation of the cylinder 16. By selecting a higher gear ratio in the selector 62, the screw 45 is made to rotate faster relative to the rotation of the cylinder 16 and thereby increase the axial movement of the cylinder for each revolution so that there will be an increase in the helical lead to accommodate a wider strip as, for example, a sidewall strip. By selecting a lower ratio in the selector 62, the revolutions of the screw 45 for each revolution of the cylinder 16 are decreased and thereby a short lead is provided to accommodate narrower strips such as chafers or chippers.

To load the cylinder 16, the strip S is delivered from the strip preparation apparatus 12 at the letoff position 14 by way of a conventional tensioning and guiding apparatus including a dancer roll 63 and the two fixed support rolls 65,67 after which the strip is led over a combining roll 70. At the combining roll 70 the strip S is positioned in face-to-face relation with a separator cloth 71 to prevent successive turns of the strip on the reel 10 from sticking to each other. The cloth 71 is supplied from a conventional letoff spool 72 and is from one to two times as wide as the strip S. One or more strips S may be carried by one separator cloth 71 if desired. The separator cloth 71 is also made of a suitable sheet material of a type well known in the art having the property of supporting the strips S without becoming adhered thereto.

The strip S and the cloth 71 which is under tension are led from the combining roll 70 to the supply reel cylinder 16 and are then wound thereabout by rotation of the cylinder while the cylinder is moved axially relative to the letoff position 14 in timed relation with the rotation of the cylinder. This results in a spiral winding of the strip S and cloth 71 on the surface of the cylinder 16. In the following description where the strip S is referred to, the cloth 71 is assumed to be associated therewith for supporting and preventing adhesion of the turns of strip material with each other.

In accordance with the method of the invention, suitable controls are provided to actuate the engagement of forward clutch 54 to rotate the screw 45 in one direction which will move the platform 31 including the truck 22 and supply reel 10 in a forward direction or to the left as shown in FIG. 3. The controls also include means for actuating the disengagement of the clutch 54. In a similar manner suitable controls are provided to actuate the engagement of the reverse clutch 56 to rotate the screw 45 in an opposite direction which will move the platform 31, truck 22 and supply reel 10 in a reverse direction or to the right as shown in FIG. 3. The controls also include means for actuating the disengagement of the clutch 56. When both the forward and reverse clutches 54 and 56 are disengaged the movement of the platform 31, truck 22 and supply reel 10 relative to the letoff position 14 will be stopped even though the cylinder 16 of the supply reel 10 is still rotated by the gear motor 41 connected to the shaft 37 by the flexible drive 43.

Figure 4:
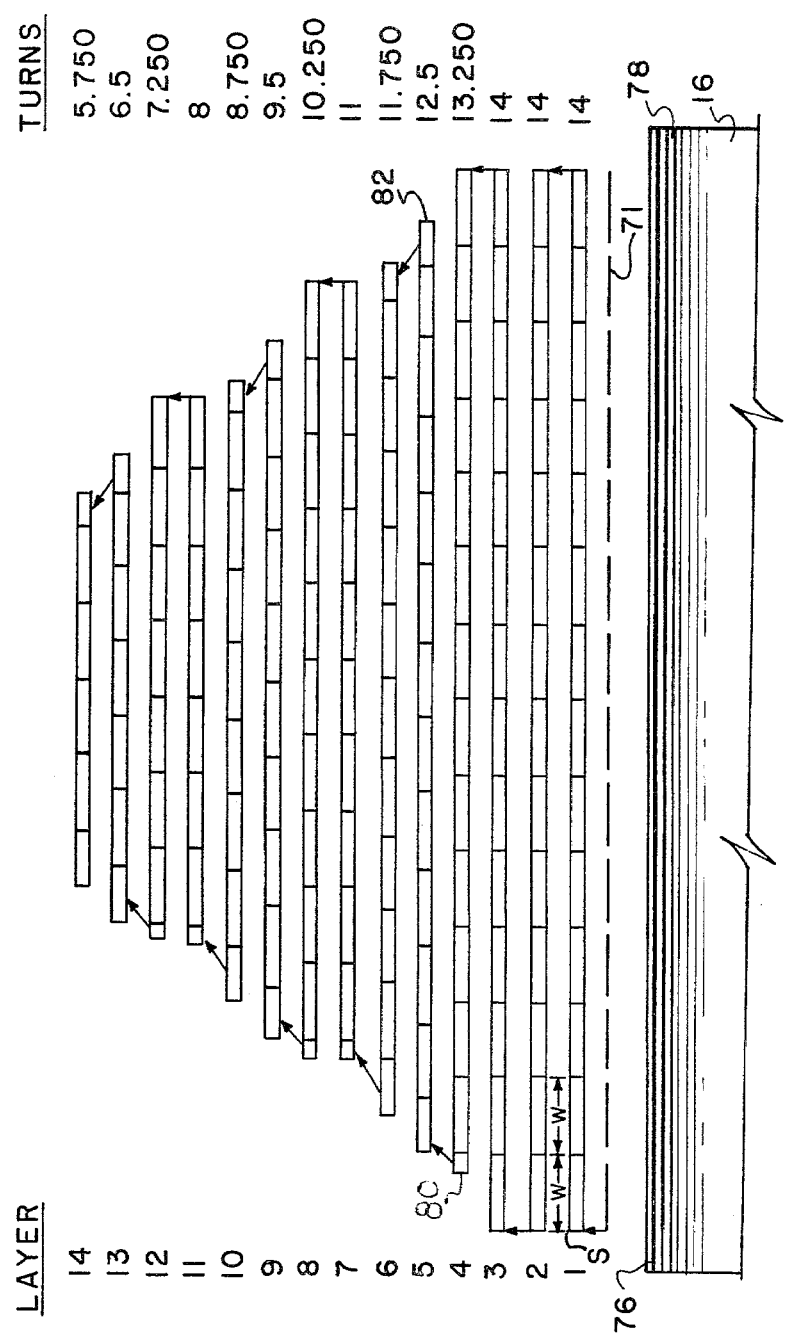
FIG. 4 is a diagrammatic view illustrating the pyramid wind up of the strip on the supply reel.

As shown schematically in FIG. 4, it is preferred to spiral wind the strip S on the cylinder 16 by laying an end of the separator cloth 71 on the surface of the cylinder 16 at a suitable position such as the right end 78. The gear motor 41 is then started causing the shaft 37 to be rotated by the flexible drive 43. The gear ratio in the selector 62 is set to wind a strip of the separator cloth 71 having a width W in a spiral path and with each turn being in side-by-side relationship to the next turn. The reverse clutch 56 is engaged and the screw 45 rotated until a full pass of the cloth 71 is wound on the cylinder 16 under tension. The gear motor 41 is then stopped and the end of the strip S is fastened to the cloth as by tucking under the cloth 71 at a suitable position such as the left end 76 of the cylinder.

The forward clutch 54 is then engaged and the cylinder 16 and the screw 45 rotated continuously to form a first layer while the supply reel 10 is moved to another position such as the right end 78. In this embodiment this takes fourteen turns of the cylinder 16. The forward clutch 54 is then disengaged and the reverse clutch 56 engaged causing the cylinder 16 to move axially relative to the letoff position 14 in the reverse direction until the strip S is at the left end 76 of the cylinder and the cylinder has rotated another fourteen turns forming a second layer. The reverse clutch 56 is then disengaged and the forward clutch 54 engaged to move the cylinder 16 in the forward direction to form a third layer of the same number of turns.

The forward clutch 54 is then disengaged and the reverse clutch 56 engaged to move the cylinder 16 in the reverse direction forming a fourth layer which is the first pyramid layer. The first, second and third layers are base layers providing a base on which the pyramid layers four through fourteen are supported.

The cylinder 16 is continuously rotated a lesser number of turns than the fourteen revolutions for layers four, five and six. In this embodiment, the fourth layer has thirteen and one-quarter turns. The forward clutch 54 is then disengaged and neither clutch engaged so that the forward axial movement is stopped at a first predetermined position 80 and the first pyramid layer has a length less than the length of said first, second and third base layers.

To provide a supporting surface for additional layers and reduce the induced curl the reverse clutch 56 is not engaged for a reasonable rotation of the cylinder 16 for not more than one revolution such as one-quarter revolution. The reverse clutch 56 is then actuated causing the supply reel 10 to move in the reverse direction and form a fifth layer which is a second pyramid layer. As shown by the arrow in FIG. 4 the edge strip of the fifth layer overlaps part of the third layer. The reverse axial movement of the cylinder 16 is continued until the strip S reaches a second predetermined position 82 after twelve and one-half turns with the second pyramid layer having a length less than the length of the first pyramid layer. The reverse clutch 56 is then disengaged and neither clutch is engaged so that the axial movement of the reel 10 is stopped. The forward clutch 54 is not engaged for one-quarter revolution after which it is again engaged and the cylinder 16 rotated for eleven and three-quarters turns providing a sixth layer which is the third pyramid layer and is of a shorter length than the second pyramid layer. As shown by the arrow in FIG. 4 the edge strip of the sixth layer overlaps part of the fourth layer. The forward clutch 54 is then disengaged and the reverse clutch 56 is not engaged for one-quarter revolution to reduce the induced curl of the strip S. The reverse clutch 56 is then engaged to form the seventh layer which is the fourth pyramid layer.

During the winding of the eighth through fourteenth layers (fifth to eleventh pyramid layers) the axial movement of the shaping reel 10 is stopped for a predetermined time corresponding to one-quarter revolution at the end of each pass and the lengths of the layers are progressively shortened to form a pyramid shape like that shown in FIG. 4. In this embodiment the length of each successive pyramid is shortened by three-quarters of a revolution of the cylinder 16; however, the amount may be varied depending upon the width and type of material being stored. As shown in FIG. 4, the number of turns and consequently the length of the layers from layer seven through fourteen is reduced from eleven turns to five and three-quarter turns. The length of time the axial movement of the reel 10 is stopped also determines the amount of supporting surface provided at the ends of the cylinder 16 for the outer layers. The longer the reel 10 is rotated the greater the supporting surface.

Figure 5:
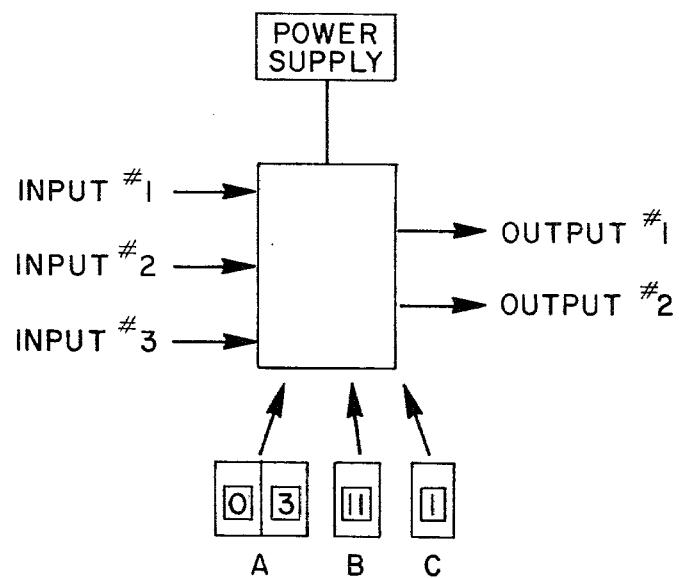
FIG. 5 is a block diagram showing controls for operating the apparatus in accordance with the method of the invention.

Referring to FIG. 5, a control means 84 is illustrated which includes a microprocessor 86 of a type available for purchase which is adapted to automatically manipulate the axial movement of the cylinder 16 relative to the letoff position 14 in response to settings made by an operator and movements of the winding apparatus described heretofore. As indicated, the microprocessor 86 has a power supply 88 which supplies the microprocessor with operating power and also power to actuate the forward clutch 54 from the number one output and to actuate the reverse clutch 56 from the number two output. The control program may use a count based on one-quarter turn of the cylinder 16. A turn counter is connected to the microprocessor 86 to provide the number one input. Number two input is from the right-hand limit switch 58 which is set for actuation at the beginning of the winding operation to make sure that the left end 76 of the cylinder 16 is in alignment with the letoff position 14. Number three input is from the left-hand limit switch 60 providing an indication that the first layer of the strip S extends from the left end 76 of the cylinder 16 to the right end 78 and therefore the full surface of the supply reel 10 is utilized.

Thumb wheel switches A, B and C also provide input into the microprocessor 86. Thumb wheel switch A is set to indicate how many full base layers are desired and this varies from one material to the other. Thumb wheel switch B is set to indicate how many pyramid layers are desired. Thumb wheel switch C is set to indicate how long the axial movement of the cylinder 16 should be delayed at the end of each pass in which a layer of the strip S is wound around the cylinder. With this program the length of the end dwell may be set at one-quarter, one-half, three-quarters or four-quarters maximum rotation by setting the thumb wheel switch C at numerals one through four.

For example, in the embodiment described hereinabove, the first layer contains fourteen turns which with the program utilized in this microprocessor 86 requires fifty-six counts. The pause of one-quarter turn at the end of the pass requires one count. The number of base layers is three and the number of pyramid layers is eleven.

In operation the operator sets the thumb wheel switches A, B and C. The end of the strip S is connected to the separator cloth 71 at the left end 76 of the cylinder 16 which is in alignment with the letoff position 14. In this position the right-hand limit switch 58 will be actuated and clear the microprocessor for starting the winding operation. The gear motor 41 and the microprocessor 86 are then started which causes the strip S and separator cloth 71 to be wound around the cylinder 16 as described hereinabove. An automatic switch may be provided to turn off the gear motor 41 and the microprocessor 86 when the required number of layers have been laid on the cylinder. However, turning off the apparatus is preferably done manually by an operator who is observing the operation.

While a certain representative embodiment and details have been shown for the purpose of illustrating the invention, it will be apparent to those skilled in the art that various changes and modifications may be made therein without departing from the invention.

We claim:

1. A method of spiral winding strip material subject to induced curl from a letoff position onto a supply reel comprising
   (a) laying an end of said strip material on the surface of said reel and continuously rotating said reel;
   (b) providing forward axial movement of said reel relative to said letoff position in a first direction to spiral wind said strip on the surface of said reel to form a first layer of said strip material having an axial length less than the length of said reel;
   (c) stopping said forward axial movement to form a first edge strip of the wound material;
   (d) providing a reverse axial movement of said reel relative to said letoff position in a second direction opposite to said first direction to spiral wind said strip on the surface of said first layer to form a second layer of said strip material;
   (e) stopping said reverse axial movement to form a second edge strip of the wound material;
   (f) thereafter continuing to alternately provide said forward and reverse axial movement of said reel relative to said letoff position to form overlapping layers which are progressively of shorter length by reducing the number of revolutions of said reel for each overlapping layer providing at least one pyramidal edge with axially spaced edge strips; and
   (g) continuing to rotate said reel for a predetermined rotation for each of said layers at said pyramidal edge when axial movement of said reel is stopped to provide supporting surfaces at said axially spaced edge strips and a minimum of curl of said strip material.

2. The method of claim 1 wherein said first edge strip and said second edge strip of said wound material are positioned at said one end of said reel and at said other end of said reel.

3. The method of claim 1 wherein said forming of overlapping progressively shorter lengths of said layers is provided by reducing the number of revolutions of said reel for each overlapping layer by three-quarters of a revolution.

4. The method of claim 1 wherein said predetermined rotation of said reel after stopping said axial movement is limited to not more than one complete revolution of said reel to provide the desired supporting surface for the other layers of the strip material.

5. The method of claim 1 wherein said strip material includes at least one tacky uncured tire building component carried by a strip of separator material.

6. The method of claim 4 wherein said predetermined rotation of said reel after stopping of said forward and reverse axial movement is for one-quarter revolution of said reel.

* * * * *